(12) United States Patent
Tang

(10) Patent No.: US 11,223,949 B2
(45) Date of Patent: Jan. 11, 2022

(54) METHOD AND DEVICE FOR NETWORK SLICE AUTHENTICATION

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 17/204,748

(22) Filed: Mar. 17, 2021

(65) Prior Publication Data
US 2021/0204126 A1 Jul. 1, 2021

Related U.S. Application Data

(63) Continuation of application No. PCT/CN2018/106341, filed on Sep. 18, 2018.

(51) Int. Cl.
*H04W 12/06* (2021.01)
*H04W 60/00* (2009.01)

(52) U.S. Cl.
CPC .......... *H04W 12/06* (2013.01); *H04W 60/00* (2013.01)

(58) Field of Classification Search
CPC ..... H04W 12/06; H04W 60/00; H04W 48/12; H04W 12/08; H04W 80/10
See application file for complete search history.

(56) References Cited

U.S. PATENT DOCUMENTS

| | | | | |
|---|---|---|---|---|
| 2020/0053083 | A1* | 2/2020 | Kunz | H04W 12/06 |
| 2020/0100173 | A1* | 3/2020 | Casati | H04L 63/08 |
| 2020/0128614 | A1* | 4/2020 | Ying | H04L 29/08 |
| 2020/0413241 | A1* | 12/2020 | Park | H04W 76/18 |

FOREIGN PATENT DOCUMENTS

| | | |
|---|---|---|
| CN | 106572516 A | 4/2017 |
| CN | 107689169 A | 4/2018 |
| CN | 108347729 A | 7/2018 |

OTHER PUBLICATIONS

The international search report of PCT application No. PCT/CN2018/106341, dated Jun. 17, 2019.
3rd Generation Partnership Project; Technical Specification Group Services and System Aspects; System Architecture for the 5G System; Stage 2 (Release 15); 3GPP TS 23.501 V15.2.0 (Jun. 2018).
3rd Generation Partnership Project; Technical Specification Group Services and System Aspects; Procedures for the 5G System; Stage 2 (Release 15); 3GPP TS 23.502 V15.2.0 (Jun. 2018).
(Continued)

*Primary Examiner* — Brandon J Miller
(74) *Attorney, Agent, or Firm* — Ladas & Parry, LLP

(57) ABSTRACT

Embodiments of the present application provides a method and device for network slice authentication, which is beneficial to realize an authentication of a terminal device by a third-party server. The method includes: acquiring, by a terminal device, first indication information, where the first indication information is used to indicate whether a third-party server corresponding to at least one network slice needs to perform authentication on the terminal device.

22 Claims, 3 Drawing Sheets

(56) References Cited

OTHER PUBLICATIONS

Written Opinion of the International Searching Authority in PCT application No. PCT/cn2018/106341, dated Jun. 17, 2019 with English translation provided by Google Translate.
The EESR of corresponding European application No. 18934393.2, dated Jul. 15, 2021.
"3rd Generation Partnership Project;Technical Specification Group Services and System Aspects, Study on Enhancement of Network Slicing (Release 16)", 3GPP Standard, Technical Report; 3GPP TR 23.740, 3RD Generation Partnership Project (3GPP), Mobile Competence Centre; 656, Route Des Lucioles; F-06921 Sophia-Antipolis Cedex; France, No. V0.5.0 Sep. 5, 2018(Sep. 5, 2018). XP051475218, entire document.

\* cited by examiner

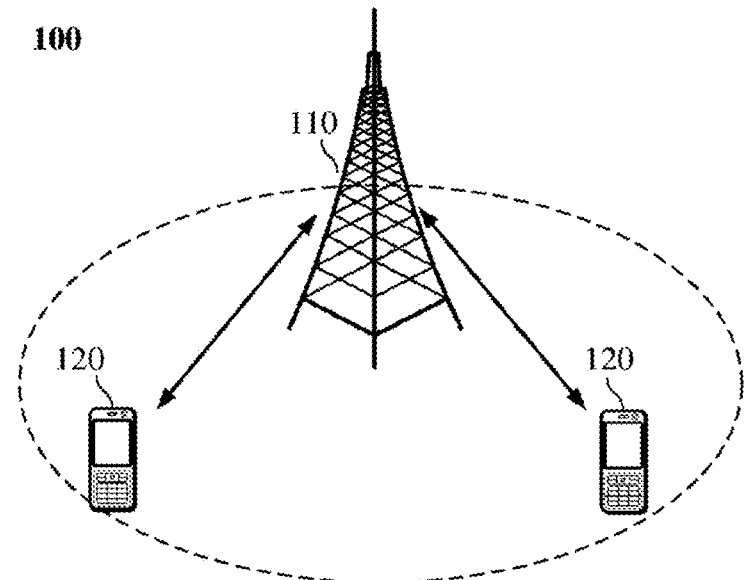

FIG. 1

A terminal device acquires first indication information, where the first indication information is used to indicate whether a third-party server corresponding to at least one network slice needs to perform authentication on the terminal device ⟋ S210

FIG. 2

A network device configures first indication information for a terminal device, where the first indication information is used to indicate whether a third-party server corresponding to at least one network slice needs to perform authentication on the terminal device ⟋ S310

FIG. 3

METHOD AND DEVICE FOR NETWORK SLICE AUTHENTICATION

CROSS-REFERENCE TO RELATED APPLICATIONS

This application is a continuation of International Application No. PCT/CN2018/106341 filed on Sep. 18, 2018, the content of which is incorporated herein by reference in its entirety.

TECHNICAL FIELD

Embodiments of the present application relates to the field of communication technologies, and in particular, to a method and device for network slice authentication.

BACKGROUND

A network slice can provide different proprietary networks for a terminal device according to different requirements of different service scenarios, and a specific network slice can only include functions required by the scenario. When the terminal device needs to use a function of a certain network slice, the terminal device can use the network slice by registering to the network slice.

In order to make the terminal device registered to the network slice to be an authorized terminal device, a third-party server corresponding to the network slice needs to perform authentication on the terminal device to protect benefits of a third-party application provider. Therefore, how to perform authentication on the terminal device has become an urgent problem to be solved.

SUMMARY

Embodiments of the present application provides a method and device for network slice authentication, which is beneficial to realize an authentication of a terminal device by a third-party server.

In a first aspect, a method for network slice authentication is provided, including: acquiring, by a terminal device, first indication information, where the first indication information is used to indicate whether a third-party server corresponding to at least one network slice needs to perform authentication on the terminal device.

In a second aspect, a method for network slice authentication is provided, including: configuring, by a network device, first indication information for a terminal device, where the first indication information is used to indicate whether a third-party server corresponding to at least one network slice needs to perform authentication on the terminal device.

In a third aspect, a terminal device is provided, which is configured to execute the method in the above first aspect or implementations thereof.

Specifically, the terminal device includes a functional module that is configured to execute the method in the above first aspect or implementations thereof.

In a fourth aspect, a network device is provided, which is configured to execute the method in the above second aspect or implementations thereof.

Specifically, the terminal device includes a functional module that is configured to execute the method in the above second aspect or implementations thereof.

In a fifth aspect, a communication device is provided, which is configured to execute the methods in the first aspect to the second aspect.

Specifically, the communication device includes a functional module that is configured to execute the methods in the first aspect to the second aspect.

In a sixth aspect, a communication device is provided, including a processor and a memory, where the memory is configured to store a computer program, and the processor is configured to call and run the computer program stored in the memory to execute the methods in the first aspect to the second aspect.

In a seventh aspect, a chip is provided, which is configured to implement the methods in the first aspect to the second aspect.

Specifically, the chip includes: a processor, configured to call and run a computer program from a memory to enable a device installed with the chip to execute the methods in the above first aspect to the second aspect.

In an eighth aspect, a computer-readable storage medium is provided, which is configured to store a computer program that enables a computer to execute the methods in the first aspect to the second aspect.

In a ninth aspect, a computer program product is provided, including a computer program instruction that enables a computer to execute the methods in the first aspect to the second aspect.

In a tenth aspect, a computer program is provided, which, when run on a computer, enables the computer to execute the methods in the first aspect to the second aspect.

According to the above technical solutions, in the technical solutions provided by the present application, a terminal device can determine which network slices need second authentication and which network slices do not need second authentication according to first indication information. In this way, when the terminal device is registering to a network slice, it sends different request messages to a network device to register to the network slice according to authentication conditions of different network slices, which is beneficial to realize the second authentication of the terminal device by a third-party server.

BRIEF DESCRIPTION OF DRAWINGS

FIG. 1 is a schematic diagram of a communication system architecture according to an embodiment of the present application;

FIG. 2 is a schematic diagram of a method for network slice authentication according to an embodiment of the present application;

FIG. 3 is a schematic diagram of another method for network slice authentication according to an embodiment of the present application;

DESCRIPTION OF EMBODIMENTS

Figure 4:
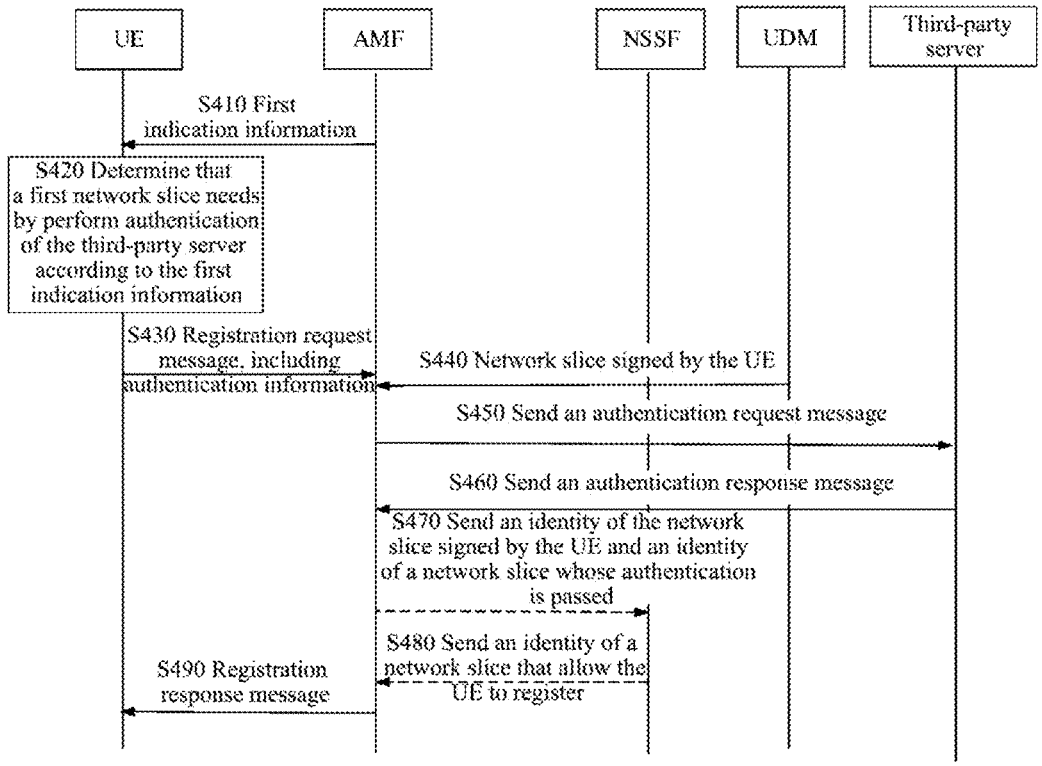
FIG. 4 is a schematic diagram of a method for network slice authentication according to an embodiment of the present application.

Technical solutions in embodiments of the present application will be described below in combination with the accompanying drawings in the embodiments of the present application. Apparently, the described embodiments are merely a part rather than all embodiments of the present application. All other embodiments obtained by persons of ordinary skill in the art based on embodiments of the present application without creative effort shall fall within the protection scope of the present disclosure.

The technical solutions of the embodiments of the present application can be applied to various communication systems, such as: Global System of Mobile communication (GSM) system, Code Division Multiple Access (CDMA) system, Wideband Code Division Multiple Access (WCDMA) system, General Packet Radio Service (GPRS) system, Long Term Evolution (LTE) system, LTE Frequency Division Duplex (FDD) system, LTE Time Division Duplex (TDD) system, Universal Mobile Telecommunication System (UMTS), Worldwide Interoperability for Microwave Access (WiMAX) communication system or 5G system, etc.

Exemplarily, a communication system 100 applied in an embodiment of the present application is shown in FIG. 1. The communication system 100 may include a network device 110, and the network device 110 may be a device that communicates with a terminal device 120 (or referred to as a communication terminal or a terminal). The network device 110 may provide communication coverage for a specific geographic area, and may communicate with a terminal device located in the coverage area. In an embodiment, the network device 110 may be a Base Transceiver Station (BTS) in a GSM system or a CDMA system, or a NodeB (NB) in a WCDMA system, or an Evolutional Node B (eNB or eNodeB) in an LTE system, or a wireless controller in a Cloud Radio Access Network (CRAN), or the network device can be a mobile switching center, a relay station, an access point, an in-vehicle device, a wearable device, a hub, a switch, a network bridge, a router, a network-side device in a 5G network or a network device in a future evolved Public Land Mobile Network (PLMN), etc.

The communication system 100 further includes at least one terminal device 120 located within a coverage area of the network device 110. The "terminal device" used herein includes, but is not limited to, a connection via a wired line, such as a device that connects via a Public Switched Telephone Network (PSTN), a Digital Subscriber Line (DSL), a digital cable, and a direct cable; and/or a device that connects via another network; and/or via a wireless interface, for example, a device that connects via with respect to a cellular network, a Wireless Local Area Network (WLAN), a digital television network such as DVB-H network, a satellite network, an AM-FM broadcast transmitter; and/or via an apparatus of another terminal device that is set to receive/send communication signals; and/or an Internet of Things (IoT) device. A terminal device that is set to communicate through a wireless interface may be referred to as a "wireless communication terminal", a "wireless terminal" or a "mobile terminal". Examples of a mobile terminal include, but are not limited to, a satellite or a cellular phone; a Personal Communications System (PCS) terminal that can combine a cellular radio phone with data processing, fax, and data communication capabilities; a PDA that can include a radio phone, a pager, Internet/Intranet access, a web browser, a notepad, a calendar, and/or a Global Positioning System (GPS) receiver; and a conventional knee and/or palmtop receivers or others electronic apparatuses including radio telephone transceivers. The terminal device can refer to an access terminal, a User Equipment (UE), a user unit, a user station, a mobile station, a mobile platform, a remote station, a remote terminal, a mobile device, a user terminal, a terminal, a wireless communication device, a user agent, or a user apparatus. The access terminal can be a cellular phone, a cordless phone, a Session Initiation Protocol (SIP) phone, a Wireless Local Loop (WLL) station, a Personal Digital Assistant (PDA), a handheld device with wireless communication functions, a computing device or other processing devices connected to a wireless modem, an in-vehicle device, a wearable device, a terminal device in a 5G network or a terminal device in a future evolved PLMN, etc.

In an embodiment, Device to Device (D2D) communication may be performed between the terminal devices 120.

In an embodiment, the 5G system or 5G network may also be referred to as a New Radio (NR) system or a NR network.

FIG. 1 exemplarily shows one network device and two terminal devices. In an embodiment, the communication system 100 may include a plurality of network devices, and a coverage of each network device may include other numbers of terminal devices, which is not limited in the embodiment of the present application.

In an embodiment, the communication system 100 may also include other network entities such as a network controller and a mobility management entity, which is not limited in the embodiments of the present application.

It should be understood that devices with communication functions in the network/system in the embodiments of the present application may be referred to as communication devices. Taking the communication system 100 shown in FIG. 1 as an example, a communication device may include the network device 110 and the terminal device 120 with communication functions, and the network device 110 and the terminal device 120 may be the specific devices described above, which will not be repeated herein. The communication device may further include other devices in the communication system 100, such as other network entities, for example a network controller and a mobility management entity, which are not limited in the embodiments of the application.

It should be understood that the terms "system" and "network" herein are often used interchangeably. The term "and/or" herein is merely an association relationship describing associated objects, and indicates that there may be three relationships. For example, A and/or B may indicate: presence of A only, of both A and B, and of B only. In addition, the character "I" herein generally indicates an "or" relationship between contextual objects.

Different application scenarios have very different requirements in terms of network functions, system performance, security, user experience, etc. If a network is used to provide a service, it will inevitably lead to the network being very complicated, heavy, and unable to reach an extreme performance required by the application, and at the same time lead to network operation and maintenance to become quite complicated, thereby increasing the cost of network operations. On the contrary, if a proprietary network is deployed to provide services according to different requirements of different service scenarios, and the network only contains functions required by this type of application scenario, then the service efficiency will be greatly improved, so that network performance required by the application scenario can also be guaranteed, network operation and maintenance become simple, and investment and operation and maintenance costs can be reduced. This proprietary network can be understood as a network slice.

When a terminal device needs to use a function of a certain network slice, the terminal device can register to the network slice.

When the terminal device is registered to a certain network slice, a network device, such as: access and mobility management function (AMF) entity, Network Slice Selection Function (NSSF) entity, needs to perform authentication on the terminal device to determine whether the terminal device is subscribed to the network slice, and the process may be referred to as a first authentication.

In some cases, in order to further protect the benefits of operators and third-party application providers, so that the terminal device accessed to the network slice is an authorized terminal device, a third-party server corresponding to the network slice is required to perform authentication on the terminal device. Therefore, how to realize authentication of the terminal device has become an urgent problem to be solved.

It should be noted that, in the embodiments of the present application, an authentication performed by the third-party server on the terminal device may also be referred to as a second authentication.

FIG. 2 is a method for network slice authentication according to an embodiment of the present application. The method in FIG. 2 includes step 210.

In step 210, a terminal device acquires first indication information, where the first indication information is used to indicate whether a third-party server corresponding to at least one network slice needs to perform authentication on the terminal device.

The embodiment of the present application does not specifically limit a form of the first indication information.

In an embodiment, the first indication information may include a plurality of indication information. Each of the plurality of indication information may be used to indicate whether a network slice needs to perform second authentication. Alternatively, each of the plurality of indication information may be used to indicate whether a plurality of network slices need to perform secondary authentication.

For example, the first indication information may include indication information A and indication information B, where the indication information A is used to indicate a network slice that needs to perform second authentication, and the indication information B is used to indicate a network slice that does not need to perform secondary authentication.

In an embodiment, for the network slice that do not need to perform second authentication, a non-indicated manner may also be used. For example, when a certain network slice acquired by the terminal device does not have corresponding indication information, it means that the network slice does not need second authentication.

In the technical solution according to the present application, the terminal device can determine which network slices need second authentication and which network slices do not need second authentication according to the first indication information. This is beneficial for the terminal device to send different request messages to a network device to register to the network slice according to authentication conditions of different network slices when registering to the network slice.

There are many ways for the terminal device to acquire the first indication information, which is not specifically limited in the embodiment of the present application.

As an example, the first indication information may be pre-configured in the terminal device. For example, before the terminal device leaves a factory, a terminal manufacturer and operator may set indication information of a network slice that needs second authentication in the terminal device.

As another example, the first indication information may be acquired by the terminal device from an application. The first indication information may be used to indicate whether the network slice used by the application needs a third-party server to perform authentication on the terminal device.

For example, the first indication information may be set in an installation package of the application. After the terminal device installs the application, the application can acquire the first indication information. The application may send the first indication information to an operating system and/or a chip of the terminal device.

For another example, after the terminal device installs the application, the application may acquire the first indication information from an application server, and send the indication information to the operating system and/or the chip of the terminal device.

In the embodiment of the present application, the chip of the terminal device may be, for example, a processor of the terminal device.

As a further example, the first indication information may also be configured by the network device for the terminal device.

The following is a detailed description of a method in which a network device configures the first indication information for the terminal device in an embodiment of the present application in combination with FIG. 3. The method in FIG. 3 includes step 310.

In step 310, a network device configures first indication information for a terminal device, where the first indication information is used to indicate whether a third-party server corresponding to at least one network slice needs to perform authentication on the terminal device.

The embodiment of the present application provides a method for the terminal device to acquire the first indication information. In the above solution, the network device can configure indication information for the terminal device indicating which network slices need second authentication and which network slices do not need second authentication. This is beneficial for the terminal device to send different request messages to the network device based on the indication information to register to the network slice.

There are many ways for the network device to configure the first indication information for the terminal device. For example, the network device may send the first indication information to the terminal device through signaling. For another example, the network device may send the first indication information to the terminal device through an open mobile alliance (OMA).

In an embodiment, the network device may configure the first indication information in UE policy or configured network slice selection assistance information (NSSAI), and the terminal device may obtain the first information from the UE policy or the configured NSSAI. The UE policy is used to indicate information such as a network slice and a data network name (DNN) and the like corresponding to at least one application in the terminal device. The configured NSSAI is used to indicate at least one network slice that can be used by the terminal device.

In an embodiment, the network device may also send signaling carrying the first indication information to the terminal device after the terminal device sends a first registration request message.

For example, the terminal device may send the first registration request message to the network device, and the network device may carry the first indication information in a first registration response message when sending the first registration response message to the terminal device.

For another example, the network device does not carry the first indication information in the first registration response message, but sends a separate signaling, such as a non-access stratum (NAS) signaling, to the terminal device to carry the first indication information after sending the first registration response message.

The first registration request message in the embodiment of the present application may refer to a request message that does not carry authentication information, and the network device may only perform simple registration for the terminal device. The network device can simply register the terminal device based on signing information of the terminal device. For example, it is determined whether the terminal device is signed to the network slice.

In an embodiment, the network device in the embodiment of the present application may be a core network device, such as an AMF, or an application layer network device.

In an embodiment, when the terminal device needs to use a certain network slice, the terminal device may determine whether the network slice needs second authentication based on the first indication information. If the network slice needs second authentication, then the terminal device can send a request message containing authentication information to the network device. If the network slice does not need second authentication, then the terminal device may send a request message that does not contain authentication information to the network device.

In this way, the terminal device can determine which network slices need second authentication actively, and carry the authentication information in the request message. It avoids a situation that every time the terminal device uses a network slice which needs second authentication, the terminal device needs to send the authentication information to the network device after the network device sends a message that requests to acquire the authentication information. This solution can save signaling cost and reduce transmission delay.

When the terminal device determines that a first network slice needs second authentication, the terminal device can send a request message to the network device, where the request message carries authentication information, and the authentication information is used for a third-party server corresponding to the first network slice to perform authentication on the terminal device.

In an embodiment, the request message may be a second registration request message, or may also be a protocol data unit (PDU) session establishment request message.

For example, the terminal device may send a second registration request message to the network device, where the second registration request message includes identification information and authentication information of the first network slice. After receiving the second registration request message, the network device may send the authentication information to the third-party server corresponding to the first network slice, so that the third-party server can perform authentication on the terminal device.

Alternatively, the terminal device may also send a NAS message to the network device, where the NAS message includes a PDU session establishment request message and the identification information of the first network slice, and the PDU session establishment request message includes the authentication information. After receiving the PDU session establishment request message, the network device can send the authentication information to the third-party server corresponding to the first network slice, so that the third-party server can perform authentication on the terminal device.

The third-party server may send an authentication result to the network device, and the network device sends a response message to the terminal device based on the authentication result. The response message may be a second registration response message, or may be a PDU session establishment response message.

In an embodiment, the response message may include a message about whether the authentication performed by the third-party server on the terminal device is passed.

The first network slice in the embodiment of the present application may be one network slice or a plurality of network slices.

As an example, the terminal device may send a message to a network device requesting registration to a plurality of network slices in one registration request message. For example, one registration request message may include identification information of the plurality of network slices and authentication information for the plurality of network slices.

Identification information of a network slice can be described by a single NSSAI (S-NSSAI). One S-NSSAI can identify one network slice.

When the terminal device sends a requested NSSAI to the network device, it may use one S-NSSAI or a plurality of S-NSSAI as the requested NSSAI, indicating that the terminal device wishes to register to network slices corresponding to the plurality of S-NSSAI.

When the network slices corresponding to the plurality of S-NSSAI all need the third-party server to perform second authentication on the terminal device, the terminal device may carry authentication information respectively corresponding to the plurality of S-NSSAI in the registration request message, so as to facilitate the third-party servers corresponding to the plurality of S-NSSAI to perform second authentication on the terminal device.

It can be understood that, among the plurality of S-NSSAI, only a part of network slices corresponding to the S-NSSAI need second authentication, while the other part of network slices corresponding to the S-NSSAI do not need second authentication. At this time, the registration request message sent by the terminal device may only carry authentication information of the network slice that needs second authentication.

In an embodiment, the terminal device may further acquire authentication information for the third-party server. A way for the terminal device to acquire the authentication information may be similar to the way for the terminal device to acquire the first indication information.

For example, the authentication information may be configured by the network device for the terminal device, or the authentication information may also be pre-configured in the terminal device, or the authentication information may also be acquired by the terminal device from an application.

In an embodiment, the terminal device may acquire a plurality of authentication information for a third-party server. When one of the authentication information is that the authentication fails, the terminal device can select other authentication information for the third-party server to perform authentication on the terminal device.

In an embodiment, the authentication information may be authentication information for the network slice and/or the DNN. The authentication information may be authentication information only for the network slice, or authentication information for both the network slice and the DNN.

For example, a part of the plurality of authentication information acquired by the terminal device is related to the network slice, and the other part of the authentication information is not only related to the network slice, but also related to the DNN.

In an embodiment, the authentication information may be, for example, in a form of domain name and password, or may be in other forms.

In an embodiment, when the network device sends the response message to the terminal device, it may send the response message to the terminal device according to the authentication result of the third-party server to the terminal device. Alternatively, the network device may also send the response message to the terminal device based on the authentication result of the third-party server to the terminal device and a network slice signed by the terminal device.

The following takes the first network slice as an example to describe a situation that the network device sends the response message to the terminal device.

For the convenience of description, the third-party server corresponding to the first network slice may be referred to as third-party server A.

In the case that the network device only considers the authentication result of the third-party server to the terminal device, when the authentication result of the third-party server A to the terminal device is that the authentication is passed, the network device may send a registration response message indicating that the registration is successful to the terminal device, while when the authentication result of the third-party server A to the terminal device is that the authentication fails, the network device may send a registration response message indicating that the registration is unsuccessful to the terminal device.

In the case that the network device not only considers the authentication result of the third-party server to the terminal device, but also considers the network slice signed by the terminal device, when the authentication result of the third-party server A to the terminal device is that the authentication is passed, and the terminal device has been signed to the first network slice, then the network device can send a registration response message indicating that the registration is successful to the terminal device, while when the authentication result of the third-party server A to the terminal device is that the authentication fails, and/or the terminal device is not signed to the first network slice, the network device may send a registration response message indicating that the registration is unsuccessful to the terminal device.

Different network slices can correspond to different third-party servers, and registration of the terminal device to different network slices needs different third-party servers to perform authentication.

In an embodiment, the third-party server may be located inside a 3rd generation partner project (3GPP) network or outside the 3GPP network, which is not specifically limited in the embodiment of the present application.

The following describes in detail a method for network slice authentication according to an embodiment of the present application with reference to FIG. 4.

S410, UE obtains first indication information. The UE can obtain one or more S-NSSAI, and indication information corresponding to the one or more S-NSSAI indicating whether it is needed to perform second authentication.

S420, based on the first indication information, the UE determines that registration to a network slice corresponding to a first S-NSSAI needs second authentication.

The first S-NSSAI may include one S-NSSAI, or may include a plurality of S-NSSAI.

S430, the UE sends a registration request message to AMF. The registration request message may include a UE ID, a requested first S-NSSAI, and authentication information corresponding to the first S-NSSAI.

The authentication information may be authentication information related to the first S-NSSAI, or authentication information related to both the first S-NSSAI and a DNN.

S440, the AMF may obtain a network slice signed by the UE from a unified data management (UDM) entity based on a UE identity (ID).

S450, the AMF sends the authentication information to a third-party server corresponding to the first S-NSSAI to enable the third-party server to perform authentication on the UE.

The AMF may determine the third-party server corresponding to the first S-NSSAI according to a local configuration. For example, the AMF may determine the third-party server corresponding to the first S-NSSAI according to the first S-NSSAI and a corresponding relationship between the first S-NSSAI and the third-party server stored locally.

Alternatively, the AMF may determine the third-party server corresponding to the first S-NSSAI based on the authentication information. In some cases, the authentication information can carry information about the third-party server. For example, in the case where the third-party server is a mailbox server, a user name included in the authentication information may carry a suffix of a mailbox, and the AMF may determine the mailbox server corresponding to the authentication information according to the suffix of the mailbox.

S460, the third-party server may send an authentication result of the first S-NSSAI to the AMF.

S470, The AMF sends an S-NSSAI whose the authentication is passed and an S-NSSAI signed by the UE to NSSF.

S480, the NSSF takes an intersection of the S-NSSAI whose authentication is passed and the S-NSSAI signed by the UE to obtain an allowed NSSAI, and send the allowed NSSAI to the AMF.

S490, the AMF sends a registration response message to the UE. The registration response message includes the allowed NSSAI and a rejected NSSAI.

If a certain S-NSSAI is rejected due to that the authentication of the third-party server to the UE fails, the AMF can also send the reason to the UE together. In other words, the response message can carry an authentication result of the third-party server to the UE.

If the UE can obtain the rejected NSSAI according to the registration response message, when the UE determines that a certain S-NSSAI is rejected due to that the authentication result of the third-party server to the UE is fails, then the UE can select other authentication information to re-initiate a registration request to the AMF.

For example, if authentication information selected by the UE for the first time is authentication information related to the network slice and the DNN, when the authentication information is that the authentication fails, the UE can select authentication information only related to the network slice, and carry the authentication information in the registration request message, and resend the registration request message to the AMF.

In an embodiment, for S470 and S480, if the AMF can perform the process of taking intersection, S470 and S480 may not be performed. The AMF can autonomously take an intersection of the S-NSSAI whose authentication is passed and the S-NSSAI signed by the UE to obtain the allowed NSSAI, and then execute S490 to send the allowed NSSAI to the UE.

The above describes in detail the methods for network slice authentication in the embodiments of the present application. The apparatuses according to the embodiments of the present application is described below in combination with FIGS. 5 to 9. The technical features described in the method embodiments are applicable to the following device embodiments.

Figure 5:
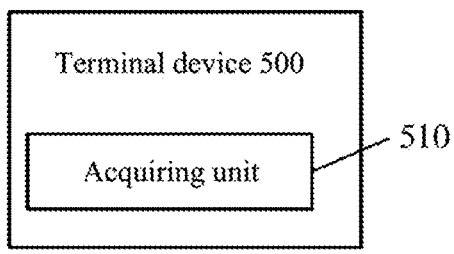
FIG. 5 is a schematic block diagram of a terminal device according to an embodiment of the present application.

FIG. 5 is a schematic block diagram of a terminal device according to an embodiment of the present application. As shown in FIG. 5, a terminal device 500 includes an acquiring unit 510.

The acquiring unit 510 is configured to acquire first indication information, where the first indication information is used to indicate whether a third-party server corresponding to at least one network slice needs to perform authentication on the terminal device.

In an embodiment, the first indication information is configured by a network device for the terminal device.

In an embodiment, the first indication information is sent to the terminal device by a network device through signaling or through an open mobile alliance OMA.

In an embodiment, the acquiring unit 510 is specifically configured to receive a first registration response message sent by a network device, where the first registration response message includes the first indication information, and the first registration response message is a response message with respect to a first registration request message sent by the terminal device to the network device.

In an embodiment, the first indication information is acquired by the terminal device from an application.

In an embodiment, the first indication information is pre-configured in the terminal device.

In an embodiment, the terminal device 500 further includes a communicating unit, configured to send authentication information of a first network slice to a network device based on the first indication information, where the authentication information is used for a third-party server corresponding to the first network slice to perform authentication on the terminal device.

In an embodiment, the authentication information of the first network slice is carried in a second registration request message.

In an embodiment, the authentication information of the first network slice is carried in a protocol data unit PDU session establishment request message.

In an embodiment, the terminal device 500 further includes the communicating unit, configured to receive a response message sent by the network device, where the response message includes information about whether the authentication performed by the third-party server corresponding to the first network slice on the terminal device is passed.

In an embodiment, the authentication information is authentication information for the first network slice and/or a data network name DNN.

Figure 6:
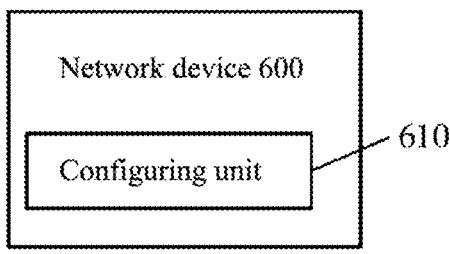
FIG. 6 is a schematic block diagram of a network device according to an embodiment of the present application.

FIG. 6 is a schematic block diagram of a network device according to an embodiment of the present application. As shown in FIG. 6, a network device 600 includes a configuring unit 610.

The configuring unit 610 is configured to configure first indication information for the terminal device, where the first indication information is used to indicate whether a third-party server corresponding to at least one network slice needs to perform authentication on the terminal device.

In an embodiment, the first indication information is sent to the terminal device by a network device through signaling or through an open mobile alliance OMA.

In an embodiment, the configuring unit 610 is specifically configured to receive a first registration request message sent by the terminal device; and send a first registration response message to the terminal device, where the first registration response message includes the first indication information.

In an embodiment, the network device 600 further includes a communicating unit, configured to receive a second registration request message or a protocol data unit PDU session establishment request message sent by the terminal device, where the second registration request message or the PDU session establishment request message includes authentication information of a first network slice; and send the authentication information to a third-party server corresponding to the first network slice to enable the third-party server corresponding to the first network slice to perform authentication on the terminal device.

In an embodiment, the communicating unit is further configured to: receive an authentication result sent by the third-party server corresponding to the first network slice; and send a second registration response message or a PDU session establishment response message to the terminal device based on the authentication result, where the second registration response message or the PDU session establishment response message includes a message about whether the authentication performed by the third-party server corresponding to the first network slice on the terminal device is passed.

In an embodiment, the authentication information is authentication information for the first network slice and/or a data network name DNN.

Figure 7:
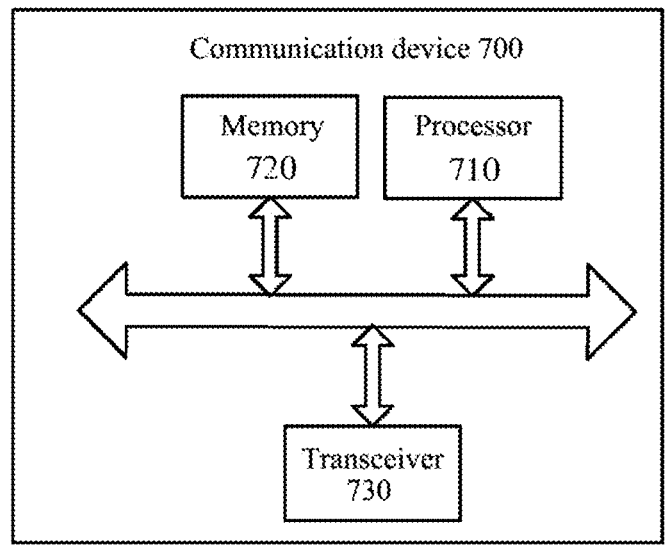
FIG. 7 is a schematic block diagram of a communication device according to an embodiment of the present application.

FIG. 7 is a schematic block diagram of a communication device 700 according to an embodiment of the present application. The communication device 700 shown in FIG. 7 includes a processor 710, and the processor 710 can call and run a computer program from a memory to implement the method in the embodiment of the present application.

In an embodiment, as shown in FIG. 7, the communication device 700 may further include a memory 720. The processor 710 may call and run a computer program from the memory 720 to implement the method in the embodiment of the present application.

The memory 720 may be a separate device independent of the processor 710, or may be integrated in the processor 710.

In an embodiment, as shown in FIG. 7, the communication device 700 may further include a transceiver 730, and the processor 710 may control the transceiver 730 to communicate with other devices. Specifically, it may send information or data to other devices, or receive information or data sent by other devices.

The transceiver 730 may include a transmitter and a receiver. The transceiver 730 may further include an antenna, and the number of the antenna may be one or more.

In an embodiment, the communication device 700 may specifically be the network device in the embodiment of the present application, and the communication device 700 may implement the corresponding process implemented by the network device in each method of the embodiment of the present application. For the sake of brevity, details are not repeated here.

In an embodiment, the communication device 700 may specifically be the terminal device in the embodiment of the present application, and the communication device 700 may implement the corresponding process implemented by the terminal device in each method of the embodiment of the present application. For the sake of brevity, details are not repeated here.

Figure 8:
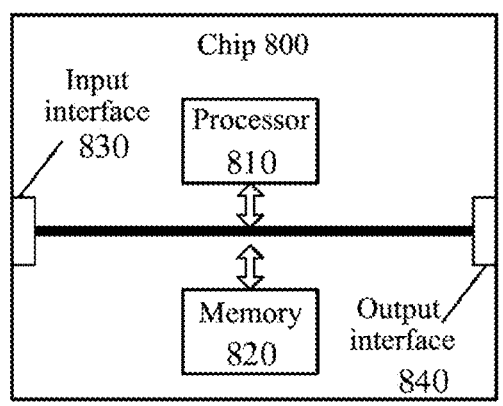
FIG. 8 is a schematic block diagram of a chip according to an embodiment of the present application.

FIG. 8 is a schematic block diagram of a chip according to an embodiment of the present application. A chip 800 shown in FIG. 8 includes a processor 810, and the processor 810 can call and run a computer program from a memory to implement the method in the embodiment of the present application.

In an embodiment, as shown in FIG. 8, the chip 800 may further include a memory 820. The processor 810 may call and run a computer program from the memory 820 to implement the method in the embodiment of the present application.

The memory 820 may be a separate device independent of the processor 810, or may be integrated in the processor 810.

In an embodiment, the chip 800 may further include an input interface 830. The processor 810 can control the input interface 830 to communicate with other devices or chips. Specifically, it can acquire information or data sent by other devices or chips.

In an embodiment, the chip 800 may further include an output interface 840. The processor 810 can control the output interface 840 to communicate with other devices or chips. Specifically, it can output information or data to other devices or chips.

In an embodiment, the chip can be applied to the terminal device in the embodiment of the present application, and the chip can implement the corresponding process implemented by the terminal device in each method of the embodiment of the present application. For the sake of brevity, details are not repeated here.

In an embodiment, the chip can be applied to the network device in the embodiment of the present application, and the chip can implement the corresponding process implemented by the network device in each method of the embodiment of the present application. For the sake of brevity, details are not repeated here.

It should be understood that the chip mentioned in the embodiment of the present application may also be referred to as a system-level chip, a system chip, a chip system, or a system-on-chip, etc.

It should be understood that the processor in the embodiment of the present application may be an integrated circuit chip with a signal processing capability. In an implementation process, the steps of the above method embodiments can be completed by hardware integrated logic circuits in the processor or instructions in a form of software. The above processor can be a general-purpose processor, a Digital Signal Processor (DSP), an Application Specific Integrated Circuit (ASIC), a Field Programmable Gate Array (FPGA) or other programming logic devices, discrete gates or transistor logic devices, discrete hardware components. The methods, steps, and logical block diagrams disclosed in the embodiments of the present application can be implemented or executed. The general-purpose processor may be a microprocessor or the processor may also be any conventional processor or the like. The steps of the method disclosed in the embodiments of the present application may be directly embodied as being executed and completed by a hardware decoding processor, or executed and completed by a combination of hardware in the decoding processor and software modules. The software module can be located in a mature storage medium in the field such as random access memory, flash memory, read-only memory, programmable read-only memory, or electrically erasable programmable memory, registers and the like. The storage medium is located in the memory, and the processor reads the information in the memory and completes the steps of the above method in combination with hardware thereof.

It could be understood that the memory in the embodiment of the present application may be a volatile memory or a non-volatile memory, or may include both volatile and non-volatile memories. The non-volatile memory can be a Read-Only Memory (ROM), a Programmable ROM (PROM), an Erasable PROM (EPROM), and an Electrically EPROM (EEPROM) or flash memory. The volatile memory may be a Random Access Memory (RAM), which is used as an external cache. By way of exemplary but not restrictive description, many forms of RAMs are available, such as Static RAM (SRAM), Dynamic RAM (DRAM), Synchronous DRAM (SDRAM), Double Data Rate SDRAM (DDR SDRAM), Enhanced SDRAM (ESDRAM), Synch Link DRAM (SLDRAM) and Direct Rambus RAM (DR RAM). It should be noted that the memories of the systems and methods described herein are intended to include, but are not limited to, these and any other suitable types of memories.

It should be understood that the above memory is exemplary but not restrictive description. For example, the memory in the embodiments of the present application may further be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM) and a Direct Rambus RAM (DR RAM) and the like. That is to say, the memory in the embodiment of the present application is intended to include but not limited to these and any other suitable types of memory.

Figure 9:
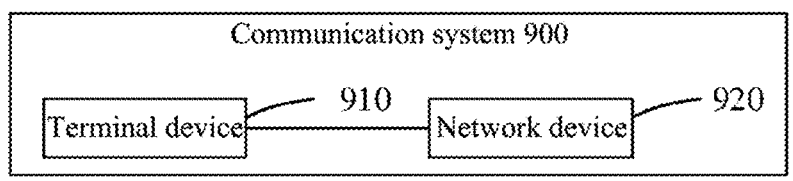
FIG. 9 is a schematic block diagram of a communication system according to an embodiment of the present application.

FIG. 9 is a schematic block diagram of a communication system 900 according to an embodiment of the present application. As shown in FIG. 9, the communication system 900 includes a terminal device 910 and a network device 920.

The terminal device 910 can be used to implement corresponding functions implemented by the terminal device in the above method, and the network device 920 can be used to implement corresponding functions implemented by the network device in the above method. For the sake of brevity, details are not repeated here.

The embodiment of the present application further provides a computer-readable storage medium which is configured to store a computer program.

In an embodiment, the computer-readable storage medium may be applied to the terminal device in the embodiment of the present application, and the computer program enables a computer to execute the corresponding process implemented by the terminal device in each method of the embodiment of the present application. For the sake of brevity, details are not repeated here.

In an embodiment, the computer-readable storage medium may be applied to the network device in the embodiment of the present application, and the computer program enables the computer to execute the corresponding process implemented by the network device in each method of the embodiment of the present application. For the sake of brevity, details are not repeated here.

The embodiment of the present application further provides a computer program product, including a computer program instruction.

In an embodiment, the computer program product can be applied to the terminal device in the embodiment of the present application, and the computer program instruction enables the computer to execute the corresponding process implemented by the terminal device in each method of the embodiment of the present application. For the sake of brevity, details are not repeated here.

In an embodiment, the computer program product can be applied to the network device in the embodiment of the present application, and the computer program instruction enables the computer to execute the corresponding process implemented by the network device in each method of the embodiment of the present application. For the sake of brevity, details are not repeated here.

The embodiment of the present application further provides a computer program.

In an embodiment, the computer program can be applied to the terminal device in the embodiment of the present application. When the computer program is run on a computer, it enables the computer to execute the corresponding process implemented by the terminal device in each method of the embodiment of the present application. For the sake of brevity, details are not repeated here.

In an embodiment, the computer program can be applied to the network device in the embodiment of the present application. When the computer program is run on the computer, it enables the computer to execute the corresponding process implemented by the network device in each method of the embodiment of the present application. For the sake of brevity, details are not repeated here.

Those skilled in the art will appreciate that the elements and algorithm steps of the examples described in conjunction with the embodiments disclosed herein can be implemented in electronic hardware or a combination of computer software and electronic hardware. Whether these functions are performed in hardware or software, it depends on specific applications and design constraints of the technical solution. A person skilled in the art may use different methods to implement the described functions with respect to each particular application, but such implementation should not be considered to go beyond the scope of the present application.

Those skilled in the art can clearly understand that, for convenience and brevity of the description, reference may be made to the corresponding processes in the above method embodiments for specific operation processes of the systems, the apparatuses and the units described above, and details will not be described herein again.

In the embodiments provided in the present application, it should be understood that the disclosed systems, apparatuses, and methods may be implemented in other manners. For example, the apparatus embodiments described above are merely illustrative. For example, the division of the units is only a logical function division. In an actual implementation, there may be another division manner. For example, multiple units or components may be combined or may be integrated into another system, or some features may be ignored or not executed. In addition, a coupling or direct coupling or communication connection shown or discussed may be an indirect coupling or communication connection through some interfaces, apparatuses or units, and may be electrical, mechanical or otherwise.

The units described as separate components may or may not be physically separated, and the components shown as units may or may not be physical units, that is, may be located in one place, or may be distributed to multiple network units. Some or all of the units may be selected according to actual needs to achieve the purpose of the solution of the embodiments.

In addition, the functional units in the embodiments of the present application may be integrated into one processing unit, or each of the units may exist alone physically, or two or more units may be integrated in one unit.

The functions may be stored in a computer readable storage medium if implemented in the form of a software functional unit and sold or used as a standalone product. Based on such understanding, the essence of the technical solution of the present application, or a part of the technical solution of the present application contributing to the prior art, or a part of the technical solution may be embodied in the form of a software product which is stored in a storage medium, including instructions for enabling a computer device (which may be a personal computer, a server, or the network device, etc.) to perform all or part of the steps of the methods described in the embodiments of the present application. The above storage medium includes: various mediums capable of storing program codes, such as a USB flash disk, a mobile hard disk, a Read-Only Memory (ROM), a Random Access Memory (RAM), a magnetic disk, an optical disk, or the like.

The above description is only specific embodiments of the present application, but the protection scope of the present application is not limited thereto. Any modification or substitution conceived by persons skilled in the art within the technical scope of the present application should be covered in the protection scope of the present application. Therefore, the protection scope of the present application is subject to the protection scope of the appended claims.

What is claimed is:

1. An authentication method, comprising:
    acquiring, by a terminal device, first indication information, wherein the first indication information is used to indicate whether authentication needs to be performed on the terminal device by a corresponding third-party server for at least one network slice;
    wherein the acquiring, by a terminal device, first indication information, comprises:
    acquiring, by the terminal device, one or more single network slice selection assistance information (S-NSSAI), wherein the one or more S-NSSAI are used to indicate whether the authentication needs to be performed on the terminal device by the corresponding third-party server for the at least one network slice;
    the method further comprises:
    determining, by the terminal device, based on the first indication information, that the authentication needs to be performed for a network slice corresponding to a first S-NSSAI, wherein the first S-NSSAI is comprised in the one or more S-NSSAI.

2. The method according to claim 1, wherein the first indication information is sent to the terminal device by a network device through signaling or through an open mobile alliance (OMA).

3. The method according to claim 1, wherein the method further comprises:
    receiving, by the terminal device, a first registration response message sent by a network device, wherein the first registration response message comprises the first indication information, and the first registration response message is a response message with respect to a first registration request message sent by the terminal device to the network device.

4. The method according to claim 3, wherein the first registration request message is based on authentication result information.

5. The method according to claim 3, wherein the first registration response message is based on authentication result information.

6. The method according to claim 5, wherein the authentication result information comprises authentication successful information.

7. The method according to claim 3, wherein the first registration response message comprises rejected information for a second S-NSSAI and a rejected reason for the second S-NSSAI.

8. The method according to claim 1, wherein the terminal device acquires the first indication information from an access and mobility management function (AMF).

9. The method according to claim 1, wherein the third-party server locates inside a 3rd generation partner project (3GPP) network or outside the 3GPP network.

10. A chip, comprising: a processor, configured to call and run a computer program from a memory to enable a device installed with the chip to execute the method according to claim 1.

11. An authentication method, comprising:
configuring, by a network device, first indication information for a terminal device, wherein the first indication information is used to indicate whether authentication needs to be performed on the terminal device by a corresponding third-party server for at least one network slice, wherein the first indication information comprises one or more single network slice selection assistance information (S-NSSAI), and the one or more S-NSSAI are used to indicate whether the authentication needs to be performed on the terminal device by the corresponding third-party server for the at least one network slice, wherein the first indication information is sent to the terminal device by the network device.

12. The method according to claim 11, wherein the first indication information is sent to the terminal device by the network device through signaling or through an open mobile alliance (OMA).

13. The method according to claim 11, wherein the configuring, by a network device, first indication information for a terminal device, comprises:
receiving, by the network device, a first registration request message sent by the terminal device; and
sending, by the network device, a first registration response message to the terminal device, wherein the first registration response message comprises the first indication information.

14. A terminal device, comprising:
a processor and a memory, wherein the memory is configured to store a computer program, the processor when executing the computer program, being configured to:
acquire first indication information, wherein the first indication information is used to indicate whether authentication needs to be performed on the terminal device by a corresponding third-party server for at least one network slice;
wherein the processor is configured to:
acquire one or more single network slice selection assistance information (S-NSSAI), wherein the one or more S-NSSAI are used to indicate whether the authentication needs to be performed on the terminal device by the corresponding third-party server for the at least one network slice; and determine, based on the first indication information, that the authentication needs to be performed for a network slice corresponding a first S-NSSAI, wherein the first S-NSSAI is comprised in the one or more S-NSSAI.

15. The terminal device according to claim 14, wherein the first indication information is sent to the terminal device by a network device through signaling or through an open mobile alliance (OMA).

16. The terminal device according to claim 14, wherein the processor is further configured to:
receive a first registration response message sent by a network device, wherein the first registration response message comprises the first indication information, and the first registration response message is a response message with respect to a first registration request message sent by the terminal device to the network device.

17. The terminal device according to claim 16, wherein the first registration request message is based on authentication result information.

18. The terminal device according to claim 16, wherein the first registration response message is based on authentication result information.

19. The terminal device according to claim 18, wherein the authentication result information comprises authentication successful information.

20. The terminal device according to claim 16, wherein the first registration response message comprises rejected information for a second S-NSSAI and a rejected reason for the second S-NSSAI.

21. The terminal device according to claim 14, wherein the terminal device acquires the first indication information from an access and mobility management function (AMF).

22. The terminal device according to claim 14, wherein the third-party server locates inside a 3rd generation partner project (3GPP) network or outside the 3GPP network.

* * * * *